May 6, 1952  J. MORKOSKI  2,595,476
ROCKING FRONT WHEEL MOUNTING FOR TRICYCLE-TYPE TRACTOR
Filed Feb. 26, 1948
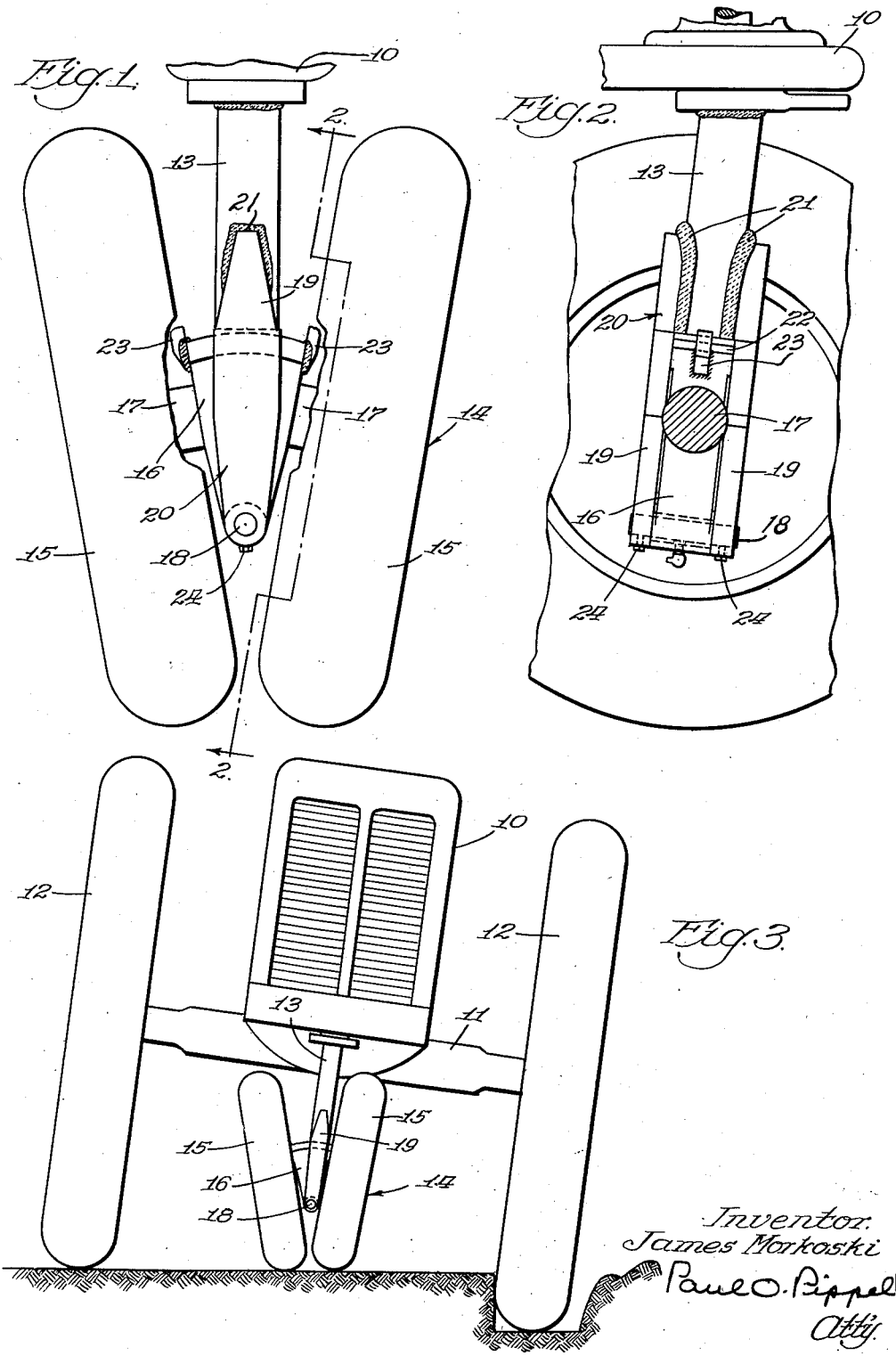
Inventor.
James Morkoski
Paul O. Pippel
Atty.

Patented May 6, 1952

2,595,476

UNITED STATES PATENT OFFICE 2,595,476

ROCKING FRONT WHEEL MOUNTING FOR TRICYCLE-TYPE TRACTOR

James Morkoski, Canton, Ill., assignor to International Harvester Company, a corporation of New Jersey Application February 26, 1948, Serial No. 11,253

1 Claim. (Cl. 180—27)

This invention relates to vehicles and particularly to a tractor of the tricycle or general purpose type.

Tricycle type tractors comprise generally a longitudinally extending body, a transverse rear axle structure at the ends of which are provided rear drive wheels, and the front end of the body is supported upon a wheeled unit including a pair of closely spaced wheels mounted on opposite sides of a vertically extending steering post. The two front wheels of the tricycle type tractor carry equal weight only when the tractor is traveling on level ground. It has been observed that when a plow, for example a right hand plow, is being drawn behind a tricycle tractor and the right rear drive wheel of the tractor is traveling in the furrow previously formed by the plow, the tractor has a tendency to pull very strongly to the right. The opposite is true when a left hand plow is being operated and the left tractor drive wheel is traveling below the level of the ground in the furrow formed by the plow, in the latter case the tractor being pulled or tending to wander to the left.

In the conventional type of tricycle tractor if we assume that the right hand tractor drive wheel is traveling below the surface of the ground in a furrow, the left hand wheel of the front dirigible supporting unit will be lifted from the ground and due to the angle assumed by the tractor, all of the weight will be placed upon the right hand wheel of the forward unit. Thus the right hand wheel is subjected to considerable wear because the load is concentrated on that wheel. It has been discovered that this fact is the major contributing factor in the tendency of the tractor to pull to the right, since this will occur when no implement is being operated by the tractor.

It is the principal object of the present invention to provide a front wheel construction for a tricycle type tractor which will overcome the foregoing disadvantages.

Another object of the present invention is to provide a mounting for the front supporting wheels which will accommodate swinging or pivoting thereof about a horizontal axis extending in the direction of travel of the tractor.

A further object of the invention is to provide a wheel mounting for a vehicle that will accommodate pivoting thereof about a horizontal axis to compensate for the tilting of the vehicle when the wheels on one side or the other are traveling in a furrow below the surface of the ground.

A further object of the invention is to provide in a tricycle type tractor a front wheel mounting which will accommodate pivoting of the front wheels about a horizontal axis to compensate for slight variations in ground contour.

Other objects and advantages of the invention will become clear from the following detailed description when read in conjunction with the accompanying drawings, wherein:

Fig. 1 is an elevation of the dirigible front wheels of a tricycle type tractor showing the structure covered by the present invention.

Fig. 2 is a view in partial section taken on the line 2—2 of Fig. 1.

Fig. 3 is a front elevation of a tractor showing the action of the dirigible front wheels when one of the tractor wheels is traveling in a furrow below the surface of the ground.

Referring to the drawings, it will be noted that the numeral 10 designates the longitudinally extending body of a tractor having a transverse rear axle structure 11 and rear drive wheels 12. The front end of the tractor body has mounted thereupon a generally vertically extending steering post 13 carried thereupon for rotation about a vertical axis. Steering post 13 serves for the mounting of a front supporting wheel unit generally designated by the numeral 14 and comprising a pair of laterally spaced wheels 15.

Front wheels 15 are spaced closely together to provide the tricycle support for the front end of the tractor and converge in a downward direction.

The wheels 15 are mounted upon the steering post 13 by means of a supporting structure comprising a triangularly shaped block 16 having stub axle portions 17 extending outwardly and at an angle downwardly from opposite sides thereof, and upon the outer ends of which the wheels 15 are journaled. The lower end of block 16 is apertured in a direction longitudinally of the tractor to receive a pivot pin 18, the ends of which are received in apertures in the lower depending portions of the arms 19 of a yoke 20 which is affixed by welds 21 to the steering post 13. The wheel unit 14 is thus mounted in the yoke 20 for lateral swinging movement about the pin 18 as an axis. It will be noted that the pivot pin 18 extends well below the axis of rotation of the wheels 15 upon the stub axles 17 to provide optimum pivoting of the wheels with respect to the tractor.

The upper end of the block 16 is provided with a widened portion 22 to provide contact of the block 16 with the arms 19 of the yoke 20 and prevent wobbling of the wheel unit. Stop members 23 are secured by welding to opposite sides of the block 16 to engage the yoke and limit the pivoting of the wheel unit about pin 18. The pin 18 is held in the yoke by means of setscrews 24.

As will be noted particularly well in Fig. 2, the lower portion of the steering post 13 extending below the tractor body 10 is bent rearwardly so that the contact point of each of the wheels 15 is on a vertical line directly below the axis thereof rather than on a vertical line below the axis of rotation of the steering post. This is to facilitate castering of the wheel unit 14 and provide for steering of each.

As pointed out before, the present construction is provided primarily to compensate for the angle assumed by the tractor when one of the tractor wheels is traveling in a furrow below the level of the ground. With previous constructions wherein a rigid front wheel unit was utilized and where the left hand tractor drive wheel, for example, was traveling in a furrow, all of the weight of the front end of the tractor would be placed upon the left hand wheel 15. However, the present construction provides compensation for such tilting of the tractor and, as shown in Fig. 3 with the left hand rear drive wheel traveling in a furrow, the weight of the front end of the tractor is, by virtue of the pivoting of the wheel unit 14 about its axis upon the pivot pin 18, equally distributed upon the two wheels 15 so that no excessive wear occurs upon either wheel and there is substantially no tendency of the tractor to pull in the direction in which it is leaning.

It is believed that the present invention will be clearly understood from the foregoing description. However, it should be understood that modifications may be made therein without departing from the spirit of the invention or the scope of the appended claim.

What is claimed is:

In a tricycle tractor having a body, laterally spaced rear drive wheels, a generally vertically extending rotatable steering post carried at the forward end of the body, said steering post having a lower bent portion extending rearwardly and downwardly, a pair of castering adjacent downwardly converging front wheels substantially rigidly connected close together and adapted to travel upon the surface, and means for mounting said wheels as a unit on the lower bent portion of said steering post rearwardly of the vertical axis thereof so as to facilitate castering of the wheels and to compensate for the tilt of the tractor caused by one of said drive wheels traveling in the furrow, comprising longitudinally extending pivot means carried at the lower end of the steering post and means for mounting said front wheels on said pivot means below the axes of rotation of said wheels to accommodate lateral swinging of the wheels as a unit when the tractor is tilted.

JAMES MORKOSKI.

REFERENCES CITED

The following references are of record in the file of this patent:

UNITED STATES PATENTS

| Number | Name | Date |
| --- | --- | --- |
| 314,285 | Angell | Mar. 24, 1885 |
| 424,397 | Williams et al. | Mar. 25, 1890 |
| 726,146 | Dickinson | Apr. 21, 1903 |
| 1,228,307 | Evans | May 29, 1917 |
| 1,585,100 | Kegresse | May 18, 1926 |
| 1,793,482 | Hendrickson | Feb. 24, 1931 |
| 1,878,139 | Hertner | Sept. 20, 1932 |
| 2,220,361 | Westphal | Nov. 5, 1940 |
| 2,273,630 | Dunham et al. | Feb. 17, 1942 |
| 2,301,152 | Strehlow | Nov. 3, 1942 |
| 2,369,759 | Smith | Feb. 20, 1945 |
| 2,399,043 | Klumb | Apr. 23, 1946 |